2,843,605
Patented July 15, 1958

2,843,605
CYANOACETAMIDOPHTHALIC ANHYDRIDES AND DERIVATIVES THEREOF

Donald A. Smith, Rochester, N. Y., assignor to Eastman Kodak Company, Rochester, N. Y., a corporation of New Jersey No Drawing. Application December 17, 1956
Serial No. 628,507

9 Claims. (Cl. 260—346.3)

This invention relates to dicarboxylic acids containing a reactive cyanoacetamido group substituent and anhydrides thereof, and to a process for preparing the same.

Compounds containing active methylene groups are of considerable interest because of their high reactivity particularly with carbonyl group containing compounds. This desirable property has been found to be especially useful for preparing various modified polymers. However, up to the present no satisfactory method for affixing the reactive cyanoacetamido group, —NHCOCH$_2$CN, to a polymer chain has been available. I have now found that certain dicarboxylic acids can be prepared containing the above group as a nuclear substituent and that they and the anhydrides thereof can be reacted with hydroxyl group containing polymers to give highly reactive modified polymers. For further details on the preparation and uses of such modified polymeric materials, reference can be held to copending application Serial No. 628,514, of S. H. Merrill and D. A. Smith, describing light-sensitive polymeric materials, and copending application Serial No. 628,513, of D. A. Smith and C. C. Unruh, describing polymeric vehicles for silver halide emulsions, both filed of even date herewith.

It is accordingly, an object of the invention to provide a new class of dicarboxylic acids and anhydrides thereof containing as a substituent a cyanoacetamido group. Another object is to provide a process for preparing these acids and anhydrides. Other objects will become apparent hereinafter.

In accordance with the invention, I prepare the compounds of my invention which may be represented by the following general formulas:

(I) 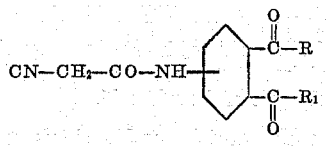

(II) 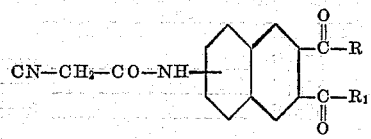

and
(III) 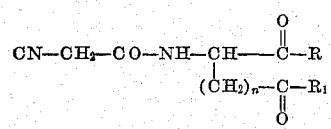

wherein $n$ represents a whole number of from 1 to 2, R and R$_1$ are the same and represent an —OH group, an —OX group wherein X represents an alkali metal atom e. g. sodium or potassium or R and R$_1$ together represent an atom of oxygen, i. e. the anhydrides of above compounds I, II and III. The preferred compounds are those represented by the above formula I, i. e, the cyanoacetamido phthalic acids and alkali metal salts and anhydrides thereof, and more particularly 3- and 4-cyanoacetamido phthalic anhydrides. The process for preparing the compounds of the above formulas comprises, in general, reacting an amino dibasic acid compound such as an amino phthalic acid represented 3-aminophthalic acid, dimethyl 4-aminophthalate, etc., an aminonaphthalene dicarboxylic acid represented by naphthalene-5-amino-2,3-dicarboxylic acid, etc., or an aliphatic amino acid represented by aspartic or glutamic acid, etc., with a cyanoacetyl chloride or with cyanoacetic acid in the presence of a carbodiimide such as dicyclohexylcarbodiimide, in an inert dry or anhydridous liquid medium such as ether, benzene, methylene chloride, low boiling hydrocarbons, etc., at from 5° to about room temperature, to give the corresponding cyanoacetamido derivatives, which can then be converted to an anhydride by heating to refluxing temperature with acetic anhydride or acetyl chloride, and separating the resulting cyanoacetamido anhydride products from the reaction mixtures by conventional methods of separation such as chilling and crystallization, solvent extraction and crystallization, and the like. The proportions employed of the amino dibasic acid compound and the cyanoacetyl chloride, or the cyanoacetic acid and the carbodiimide, are generally in about equimolar proportions, although a slight excess of the cyano reagent is preferred. For the step of conversion to the anhydrides, preferably a substantial excess of acetic anhydride or of acetyl chloride is employed, for example, from as little as one mole to as high as 10 moles of these reagents to each mole of the amino dibasic acid compound.

The following examples will serve to illustrate further the preparation of the compounds of the invention.

*Example 1.—Preparation of sodium 3-aminophthalate*

A solution of 1370 g. of 3-aminophthalic acid in 8 liters of methanol was treated with 8 kg. of 10% sodium hydroxide in methanol. The fine solid which separated was collected, washed with methanol and dried to yield 1500 g. of pale yellow powdered sodium 3-aminophthalate.

*Example 2.—Preparation of 3-cyanoacetamidophthalic anhydride*

A suspension of 580 g. of phosphorus pentachloride in 1 liter of ether was chilled in ice, and then treated with 236 g. (2.78 mol.) of cyanoacetic acid in 2 liters of ether, while maintaining the temperature at 5° to 15° C. When the addition was complete, the ether was removed at the water pump, and the phosphorus oxychloride at 20° C. and 0.5 mm. pressure.

The residual oil was taken up in 1 liter of dry ether and added gradually to a suspension of 225 g. (1 mol.) of sodium 3-aminophthalate in 1.5 liters of dry ether so that the temperature did not exceed 25° C. After 2 hours stirring, the mixture was allowed to stand overnight, then filtered and the solid dried at 40° C. This material was then made into a paste with 230 cc. of water and the solid sucked dry on a Büchner funnel. After drying, the bulk of the acid was treated with 700 cc. of acetic anhydride and warmed to 105° C., with stirring. The mixture was quickly filtered and the filtrate chilled, whereupon 130 g. of pale yellow crystals separated. This product melted at 180°–181° C. Analysis showed that it contained by weight 57.4% of carbon, 3.0% of hydrogen and 12.3% of nitrogen compared with calculated theory for $C_{11}H_6N_2O_4$ of 57.4%, 2.6% and 12.2% respectively. This result indicated that the product obtained was relatively pure 3-cyanoacetamidophthalic anhydride having the structure:

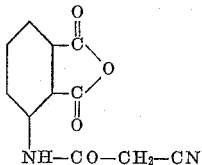

The above product when hydrolyzed with aqueous sodium hydroxide formed the disodium salt of 3-cyanoacetamidophthalic acid. When reacted with hydroxyl group containing polymers such as polyvinyl alcohol, partially hydrolyzed polyvinyl esters, cellulose acetate containing free hydroxyl groups, etc., the above anhydride gave the corresponding polymeric ester derivatives which were found useful as coating materials, as gelatin substitutes, and reaction products of which with aldehydes gave modified polymers that had the valuable property of becoming insoluble on exposure to actinic light.

*Example 3.—Preparation of 4-cyanoacetamidophthalic anhydride*

To a solution of 10.4 g. (0.05 mol.) of dimethyl 4-aminophthalate and 4.25 g. (0.05 mol.) of cyanoacetic acid in 70 cc. of methylene chloride contained in a round-bottomed flask were added 11.0 g. (0.056 mol.) of N,N'-dicyclohexylcarbodiimide. After the reaction was complete, the urea was removed by filtration, and the solution concentrated in vacuo. The party mass was treated with 50 cc. of ethanol to give a solution, then with 50 cc. of benzene and sufficient ligroin to cause crystallization. The yield of dry dimethyl-4-cyanoacetamidophthalate, M. P. 120°–122° C., was 10.5 g. Analysis showed that it contained by weight 57.0% of carbon, 4.8% of hydrogen and 10.8% of nitrogen compared with calculated theory of 56.5%, 4.4% and 10.2%, respectively.

A suspension of 13.5 g. of the above ester in 60 cc. of ethanol was added to a solution of 2.3 g. of sodium in 70 cc. of ethanol. After 10 minutes heating on the steam bath, the mixture was filtered and the solid washed with ethanol. The free acid was isolated by solution of the sodium salt in a minimum of water and acidification with concentrated hydrochloric acid. A yield of 5 g. of crude 4-cyanoacetamidophthalic acid, M. P. 190°–191° C., was obtained. A sample of the above recrystallized from hot water melted at 193°–195° C. and showed on analysis that it contained by weight 53.3% of carbon, 3.8% of hydrogen and 11.5% of nitrogen compared with calculated theory for $C_{11}H_8N_2O_3$ of 53.3%, 3.2% and 11.3%, respectively.

The 4-cyanoacetamidophthalic acid prepared above was converted to its anhydride by refluxing for several hours with an excess of acetyl chloride. It had the structure:

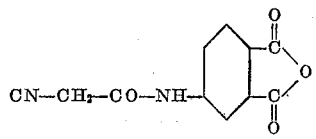

and behaved in a manner similar to that found with its 3-isomer with various hydroxy polymers.

In place of the dimethyl 4-aminophthalate in the above example, there may be substituted an equivalent amount of other dialkyl esters such as diethyl 4-aminophthalate, di-n-propyl 4-aminophthalate, diisopropyl 4-aminophthalate, di-n-butyl 4-aminophthalate, etc., and in place of the N,N'-dicyclohexylcarbodiimide, there may be substituted in the above example other carbodiimides, such as N,N'-dimethyl or N,N'-diethyl carbodiimides to give the same anhydride product.

The processes described in the preceding examples may be employed with any of the mentioned other amino dibasic acids to give the corresponding cyanoacetamido group substituted acids, alkali metal salts and anhydrides thereof.

What I claim is:

1. A compound selected from the group consisting of (1) an acid having the general formula:

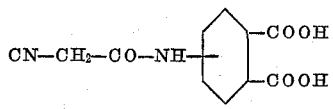

(2) a dialkali metal salt of above (1) wherein the alakli metal atoms are the same, and (3) the anhydride of above (1).

2. 3-cyanoacetamidophthalic acid.
3. Sodium salt of 3-cyanoacetamidophthalic acid.
4. Sodium salt of 4-cyanoacetamidophthalic acid.
5. 3-cyanoacetamidophthalic anhydride.
6. 4-cyanocetamidophthalic anhydride.
7. A process for preparing 3-cyanoacetamidophthalic acid which comprises reacting a dialkali metal salt of 3-aminophthalic acid with cyanoacetyl chloride, in an anhydrous inert solvent medium and at a temperature of from 5°–20° C., in the proportions of from about 1 to 3 moles of the said cyanoacetyl chloride to each mole of the said salt, and separating the resulting 3-cyanoacetamidophthalic acid.

8. A process for preparing 3-cyanoacetamidophthalic acid which comprises reacting disodium 3-aminophthalate with cyanoacetyl chloride, in dry diethyl ether and at a temperature of from 5°–15° C., in the proportions of about 2.8 moles of the said cyanoacetyl chloride to each mole of the said disodium 3-aminophthalate, and separating the resulting 3-cyanoacetamidophthalic acid.

9. A process for preparing the anhydride of 3-cyanoacetamidophthalic acid which comprises heating 3-cyanoacetamidophthalic acid with acetic anhydride, in the proportions of from 1 to 10 moles of the said acetic anhydride to each mole of the said acid.

References Cited in the file of this patent

UNITED STATES PATENTS

| | | |
|---|---|---|
| 2,680,731 | Martin | June 8, 1954 |
| 2,680,732 | Martin | June 8, 1954 |
| 2,680,733 | Martin | June 8, 1954 |